United States Patent
Kiser et al.

(10) Patent No.: US 11,925,190 B2
(45) Date of Patent: Mar. 12, 2024

(54) DEVICE FOR SHREDDING DEEP-FROZEN FOODSTUFFS PROVIDED IN BLOCK FORM INCLUDING A TOOL DETECTION DEVICE FOR DETERMINING WHETHER THE SHREDDING TOOL IS ARRANGED AS INTENDED

(71) Applicant: PACOTRADE AG, Zug (CH)

(72) Inventors: Peter Kiser, Boningen (DE); Stefan Lukas Fäh, Olten (CH)

(73) Assignee: PACOTRADE AG, Zug (CH)

( * ) Notice: Subject to any disclaimer, the term of this patent is extended or adjusted under 35 U.S.C. 154(b) by 789 days.

(21) Appl. No.: 17/040,214

(22) PCT Filed: Apr. 20, 2018

(86) PCT No.: PCT/CH2018/000017
§ 371 (c)(1),
(2) Date: Sep. 22, 2020

(87) PCT Pub. No.: WO2019/200491
PCT Pub. Date: Oct. 24, 2019

(65) Prior Publication Data
US 2021/0120841 A1    Apr. 29, 2021

(51) Int. Cl.
*A23G 9/22* (2006.01)
*A23G 9/04* (2006.01)
(Continued)

(52) U.S. Cl.
CPC ............. *A23G 9/224* (2013.01); *A23G 9/045* (2013.01); *B01F 35/605* (2022.01); *F25C 5/046* (2013.01)

(58) Field of Classification Search
CPC .......... A23G 9/224; A23G 9/045; A23G 9/22; F25C 5/046; F25C 5/043; B01F 35/60; B01F 35/605
(Continued)

(56) References Cited

U.S. PATENT DOCUMENTS 3,970,245 A * 7/1976 Aeschlimann ........ B04B 5/0414
494/9
4,464,161 A * 8/1984 Uchida ..................... B04B 7/06
494/12
(Continued)

FOREIGN PATENT DOCUMENTS

DE    102012215330 A1 * 8/2013 ............ B01F 13/045
EP    0 062 805 A2    10/1982
(Continued)

OTHER PUBLICATIONS

Office Action for Japanese Patent Application No. 2021-506020 dated Mar. 8, 2022.

*Primary Examiner* — Charles Cooley
(74) *Attorney, Agent, or Firm* — LADAS & PARRY LLP

(57) ABSTRACT

A device for shredding deep-frozen food products provided in block form comprises a tool coupled to one end of a rotatable shaft which rotates the tool about an axis of rotation and advances the tool along the axis of rotation in the direction towards the block, thereby scraping layers off the block. The tool can be uncoupled from and recoupled to the end of the shaft without using a tool. When the tool is coupled to the end of the shaft it axially abuts the shaft's end and is thereby held in a force-locking manner on the end of the shaft for the transmission of drive forces from the shaft to the tool. The device includes a tool detection device to determine whether a tool is arranged on the end of the shaft as intended so that operation can occur only when the tool is connected as intended.

11 Claims, 2 Drawing Sheets

(51) Int. Cl.
*B01F 35/60* (2022.01)
*F25C 5/04* (2006.01)

(58) Field of Classification Search
USPC .......................................................... 366/331
See application file for complete search history.

(56) References Cited

U.S. PATENT DOCUMENTS

| | | | | |
|---|---|---|---|---|
| 5,242,370 A * | 9/1993 | Silver | ...................... | B04B 13/00 |
| | | | | 422/918 |
| 5,533,806 A * | 7/1996 | Veltrop | .................. | B01F 27/805 |
| | | | | 366/206 |
| 5,665,047 A * | 9/1997 | Brimhall | ............... | B04B 5/0414 |
| | | | | 494/37 |
| 6,383,126 B1 * | 5/2002 | Fondin | .................. | B04B 5/0421 |
| | | | | 494/12 |
| 11,666,067 B2 * | 6/2023 | Manz | ..................... | A23G 9/045 |
| | | | | 241/92 |
| 2006/0169147 A1 * | 8/2006 | Cocchi | ................... | A23G 9/228 |
| | | | | 99/275 |
| 2006/0227654 A1 | 10/2006 | Blackburn et al. | | |
| 2021/0120841 A1 * | 4/2021 | Kiser | ....................... | A23G 9/22 |

FOREIGN PATENT DOCUMENTS

| | | | | |
|---|---|---|---|---|
| ES | 1 071 424 U | 2/2010 | | |
| JP | S56-36926 A | 4/1981 | | |
| JP | 2000-513211 A | 10/2000 | | |
| JP | 2002-000469 A | 1/2002 | | |
| JP | 2013-202208 A | 10/2013 | | |
| WO | 97/36498 A1 | 10/1997 | | |
| WO | WO-9736498 A1 * | 10/1997 | ............. | A23G 9/045 |
| WO | WO-2019200491 A1 * | 10/2019 | ............. | A23G 9/045 |

\* cited by examiner

DEVICE FOR SHREDDING DEEP-FROZEN FOODSTUFFS PROVIDED IN BLOCK FORM INCLUDING A TOOL DETECTION DEVICE FOR DETERMINING WHETHER THE SHREDDING TOOL IS ARRANGED AS INTENDED

RELATED APPLICATION

This application is an application under 35 U.S.C. 371 of International Application No PCT/CH2018/000017 filed on 20 Apr. 2018, the disclosures of which are incorporated in their entirety by reference herein.

TECHNICAL FIELD

The invention relates to a device for shredding, in particular pureeing or pacotizing, of frozen food products provided in block form according to the preamble of patent claim 1.

BACKGROUND ART

Generic devices for shredding of deep-frozen food products provided in block form are used for the production of creamy or foamy food product preparations, such as e.g. mousses, farces, flavor concentrates, pastes, sauces, soups, ice cream or sorbets, and today professional gastronomy would be unthinkable without them.

The beginnings of such devices date back to the Swiss engineer Wilhelm Maurer, who in the 1980s, in his search for the ultimate ice cream machine, invented a new process for processing deep-frozen food products, in which a rotating knife is used to scrape off finest layers of food from a block of food products frozen to −22° C. without thawing the scraped material. Today, this process is also known as "Pacotizing", in reference to the "Pacojet" device specially developed for its execution by the Swiss company Pacojet AG, Zug.

In order to be able to process different products in a short time without having to thoroughly clean the parts that come into contact with the products between each product change, the deep-frozen food products are placed in interchangeable containers in such devices and are shredded therein using knives that can be changed easily and without the use of tools.

EP 0 062 805 A2 shows the original version of the soft ice cream maker developed by Wilhelm Maurer, in which fine layers are scraped off a block-shaped frozen ice cream base material by means of a rotating knife, whipped and mixed with air under overpressure. The knife is connected to the supporting and driving blade shaft by means of a bayonet-like connection.

From ES1 071 424 U a device for producing a creamy or foamy food product from a food product base material in block form is known, with which layers are scraped off the food product block by means of a rotating knife. Here too, the knife is connected by means of a bayonet-like connection to the blade shaft which carries and drives it.

WO 97/36438 A1 shows a device for producing food in mousse-like consistency, which has a similar design to the soft ice cream machine from EP 0 062 805. In this device, the knife is connected to the blade shaft via a helical gearing and is held in a force-locking manner at the end of the shaft by a permanent magnet arranged in the blade shaft.

The two first mentioned devices have the disadvantage that it is practically impossible to automatically couple and uncouple the knife to and from the blade shaft, respectively, so that the knife cannot be provided together with the container containing the food product block, as described e.g. in WO 97/36498 A1, but must first be coupled to the blade shaft by hand and later be uncoupled again by hand. Apart from the fact that this is time-consuming and hygienically suboptimal, there is also the disadvantage that there is a considerable potential for injury, which requires special safety devices on the device.

The device shown in WO 97/36498 A1 avoids the disadvantages mentioned above. The problem here, however, is that under certain circumstances during automatic coupling operation, it can happen that the blade shaft pushes the knife into the container instead of coupling it to its end, with the result that the knife is located in an undefined position in the container and that a crash can occur between the knife and the blade shaft when the blade shaft continues to move forward.

With all the above mentioned devices, there is also a risk that under certain conditions, e.g. in the event of an abrupt change in speed or load, the knife may uncouple from the blade shaft unnoticed, with the result mentioned above.

Also known from the state of the art are devices in which the knife is attached to the blade shaft via a connection for which cancellation it may be required to manually operate an unlocking device. However, such devices, like the two first mentioned above, have the disadvantage that it is not possible to automatically couple and uncouple the knife to and from the blade shaft, with the consequences already mentioned before.

DISCLOSURE OF THE INVENTION

The object is therefore to provide technical solutions which do not have the disadvantages of the state of the art mentioned above or which at least partially avoid them.

This object is achieved by the subject-matter of patent claim 1.

This relates to a device for shredding, e.g. pureeing or pacotizing, of deep-frozen food products provided in block form. The device comprises a single or multi-knife tool for shredding at least a part of the deep-frozen food product block. To do this, in the intended operation of the device, the tool is rotated around a—preferably vertical axis of rotation and is thereby advanced along the axis of rotation towards the food product block so that it penetrates into the food product block while scraping off layers of food from the food product block. The tool is thereby rotated at a speed of preferably between 1000 rpm and 3000 rpm, preferably at a feed rate of between 0.5 mm and 5 mm per second.

The tool is coupled to one end of a shaft carrying and driving it in such a way that it can be uncoupled from the end of the shaft without tools and can also be recoupled to the end of the shaft as intended without tools. The coupling of the tool is designed in such a way that the tool, which is coupled to the end of the shaft as intended abuts axially against the end of the shaft, is thereby held in a force-locking manner at the end of the shaft and forms a rotational form-lock with the end of the shaft in the intended direction of drive rotation, for the transmission of drive forces from the shaft to the tool.

Further, the device comprises a tool detection device by means of which it can be determined whether a tool is arranged at the end of the shaft as intended or not.

With such devices according to the invention an automatic coupling and uncoupling of the knife to and from the blade shaft can be realized, such that the knife can be provided together with the container containing the food products block, and at the same time it can be ensured that an operation only takes place or is possible, respectively, with the tool coupled as intended. This results in a fast, hygienic and at the same time extremely safe operation.

With an advantage, the tool coupled to the end of the shaft as intended is held on the end of the shaft by frictional engagement, by means of a snap-in connection which can be released by overcoming a certain force, or by means of magnetic force. Such coupling solutions do not require any actuating mechanisms to create and/or release the connection between knife and shaft and are particularly suitable for a simple and, from a hygienic point of view, advantageous coupling of the tool on the end of the shaft, especially in the case of the magnetic version, because the coupling elements can be designed without gaps and no intensive friction between them is required, which could cause abrasion.

In case that the tool is held at the end of the shaft by magnetic force, it is preferable that the tool is made of a ferromagnetic material and that the shaft has a preferably central magnet at the end of the shaft, by means of which the tool is held at the end of the shaft. This makes it possible to provide the tools at a particularly low cost for this type of solution.

If the magnet is at least partially located in the tool when the tool is coupled to the end of the shaft as intended, particularly simple and mechanically stable solutions become possible in which the magnet is located at the end of the shaft and this end is encompassed by the tool.

In another preferred, alternative or complementary embodiment of the device, the tool is magnetic and/or the tool comprises a magnet. This magnetic design or this magnet, respectively, can be used to detect whether or not the tool is positioned as intended at the end of the shaft or not and/or it can be used to hold the tool at the end of the shaft, either solely by its magnetic force or in combination with an additional magnetic force provided at the end of the shaft.

In the latter case, the tool is magnetic at least in the area of its coupling to the end of the shaft and/or it has a magnet in this area. As has already been mentioned, this magnetic design or this magnet, respectively, alone or in combination with an additional magnet at the end of the shaft, can hold the tool in a force locking manner at the end of the shaft.

If the magnet is at least partially located in the end of the shaft when the tool is coupled to the end of the shaft as intended, particularly simple and mechanically stable solutions become possible in which the magnet is located at the shaft end of the tool and this tool end is encompassed by the shaft.

Preferably, in these types of embodiments, in which the tool is held on the end of the shaft by means of magnetic force, the end of the shaft is of a non-ferromagnetic material.

Also, in the case of those embodiments of the device in which the tool is held on the end of the shaft by means of magnetic force, it is preferable that the tool detection device comprises a Hall sensor with associated-evaluation electronics, by means of which, at least in a certain axial position of the shaft, different characteristic magnetic field strengths can be distinguished between the tool being coupled to the end of the shaft as intended and the tool not being coupled to the end of the shaft or not being coupled to the end of the shaft as intended, respectively, for determining whether a tool is arranged at the end of the shaft as intended or not. In this way it can be ensured by an appropriate operation or safety devices of the device that an operation only takes place or is only possible with the tool coupled as intended.

Thereby, the device is preferably designed in such a way that, at least in one axial position of the shaft, in which the tool coupled to the end of the shaft as intended has a maximum distance to the to be shredded frozen food product block, i.e. typically in the starting position directly after coupling of the tool, different characteristic magnetic field strengths can be distinguished between the tool being coupled to the end of the shaft as intended and the tool not being coupled to the end of the shaft or not being coupled to the end of the shaft as intended, respectively. This results in the advantage that it can be determined before the device is actually put into operation whether a tool is arranged at the end of the shaft as intended or not.

With an advantage, the Hall sensor is arranged on a stationary component of the device. This eliminates the need for any signal transmission devices from rotating to stationary components.

In a first preferred embodiment, the Hall sensor is thereby located in an area close to the shaft, preferably in an area close to the end of the shaft which, when the shaft is fully retracted, is close to the end of the shaft which holds the tool as intended. With this embodiment, the detection of the different characteristic magnetic field strengths is particularly easy.

In a second preferred embodiment, the Hall sensor is located in an area remote from the shaft. Here, a ferrite rod is arranged between the Hall sensor and the shaft, preferably between the Hall sensor and an area close to the end of the shaft which, when the shaft is fully retracted, holds the tool as intended. This embodiment creates a relatively large freedom for the placement of the Hall sensor within the device.

Thereby it is preferred that essentially no ferromagnetic components are arranged between the ferrite rod and the end of the shaft carrying the tool in order to ensure that the characteristic magnetic field strengths can be easily distinguished.

In yet another preferred embodiment, the device comprises a control unit which only permits an intended operation of the device as long as the tool detection device determines that a tool is arranged at the end of the shaft as intended or only permits it if the tool detection device has determined that a tool is arranged at the end of the shaft as intended at least in a certain position of the shaft.

BRIEF DESCRIPTION OF THE DRAWINGS

Further advantages and applications of the invention result from the now following description based on the figures. Thereby show.

MODES TOR CARRYING OUT THE INVENTION

Figure 1:
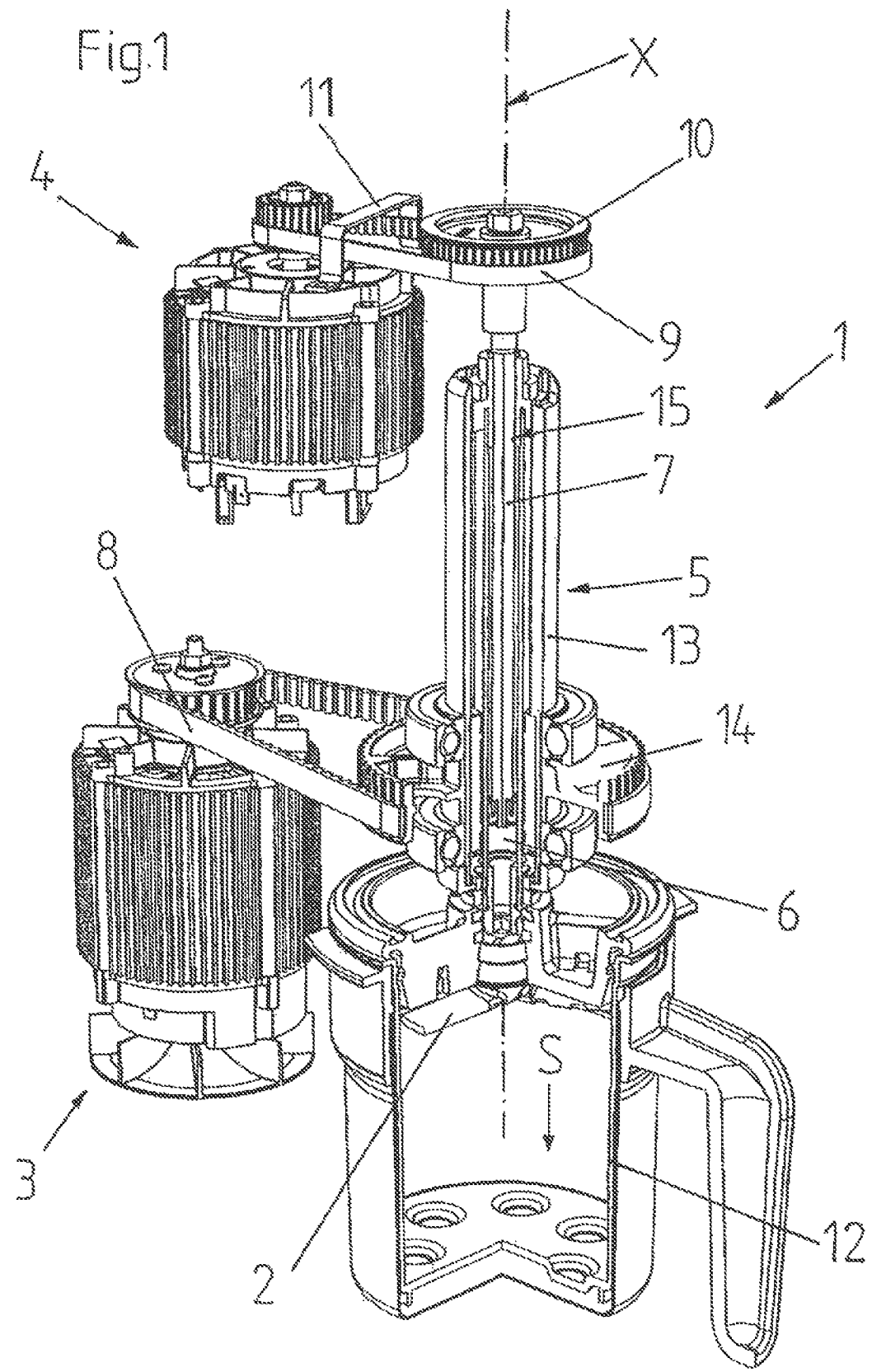
FIG. 1 a partially cut, perspective view of the major mechanical components of a device according to the invention.

FIG. 1 shows a partially cut, perspective view of the major mechanical components 1 of a device according to the invention, together with a container 12 arranged thereon in an intended location by means of which during the intended operation, the deep-frozen food products are provided as a frozen block of food products in the container 12 and in which, during the intended operation, the shredding, in particular pureeing or pacotizing, of at least a part of the deep-frozen food products block is carried out.

In this device, the shredding of the frozen food products provided in block form (not shown) is carried out by rotating the multi-winged knife 2 (tool according to the claims) around a vertical axis of rotation X and thereby advancing along this axis of rotation X towards the food products block in the direction S, whereby it scrapes off fine layers from the frozen food products block.

As can be seen, the device comprises a first-electric drive motor 3 and a second electric drive motor 4 for generating the rotational movement and for generating the feed movement of the knife 2. Both motors 3, 4 are separately controllable, variable speed and coupled to a stationary support structure of the device (not shown). Furthermore, the device comprises a gear arrangement 5, which is coupled with the two drive motors 3, 4 and is designed in such a way that only the first drive motor 3 serves to rotate the knife 2 and that both drive motors 3, 4 together serve to feed the knife.

For this purpose, the gear arrangement 5 has a rotatable hollow shaft 6 carrying the knife 2, which is mounted in an axially displaceable manner.

This hollow shaft 6 is arranged concentrically and in an axially displaceable manner in an axially stationary, rotatably mounted, longitudinally toothed drive sleeve 13, with whose longitudinal toothing it forms a rotational form-lock, such that the hollow shaft 6 can be rotated about the axis of rotation X via the drive sleeve 13 with the first drive motor 3. For this, the drive sleeve 13 has a belt wheel 14 on its outer circumference, which can be driven with the first drive motor 3 via a toothed belt 8.

Concentrically arranged in the hollow shaft 6 is an axially stationary threaded spindle 7, which can be rotated around the axis of rotation X with the second drive motor 4. For this, the threaded spindle 7 has a belt wheel 10 at its free end, which can be driven via a toothed belt 9 with the second drive motor 4.

The hollow shaft 6 has an internal thread section 15 which engages in the external thread of the threaded spindle 7. By this, the hollow shaft 6 and the threaded spindle 7 are coupled together in such a way that a rotation of the threaded spindle 7 relative to the hollow shaft 6 causes an axial displacement of the hollow shaft 6 relative to the axially stationary threaded spindle 7. In other words, a difference in rotational speed between the hollow shaft 6 and the threaded spindle 7 causes the hollow shaft 6 to be lowered or raised along the axis of rotation X and thereby causes the knife 2 to be advanced or retracted, respectively, in relation to the to be shredded food products block. At identical rotational speeds of the hollow shaft 6 and of the threaded spindle 7, the knife 2 is rotated without performing an axial movement along the axis of rotation X.

In other words, if the set directions of rotation of the two drive motors 3, 4 are identical and if the number of revolutions of the two drive motors 3, 4 are in a certain ratio at which the rotational speeds of the hollow shaft 6 and the threaded spindle 7 are identical, the knife 2 is rotated without performing any axial movement along the axis of rotation X. If this specific rotational speed ratio is exceeded or undercut, respectively, the knife 2 is additionally advanced or retracted, respectively, along the axis of rotation X, which increases or decreases in speed, respectively, as the rotational speed ratio is exceeded or undercut.

Figure 2:
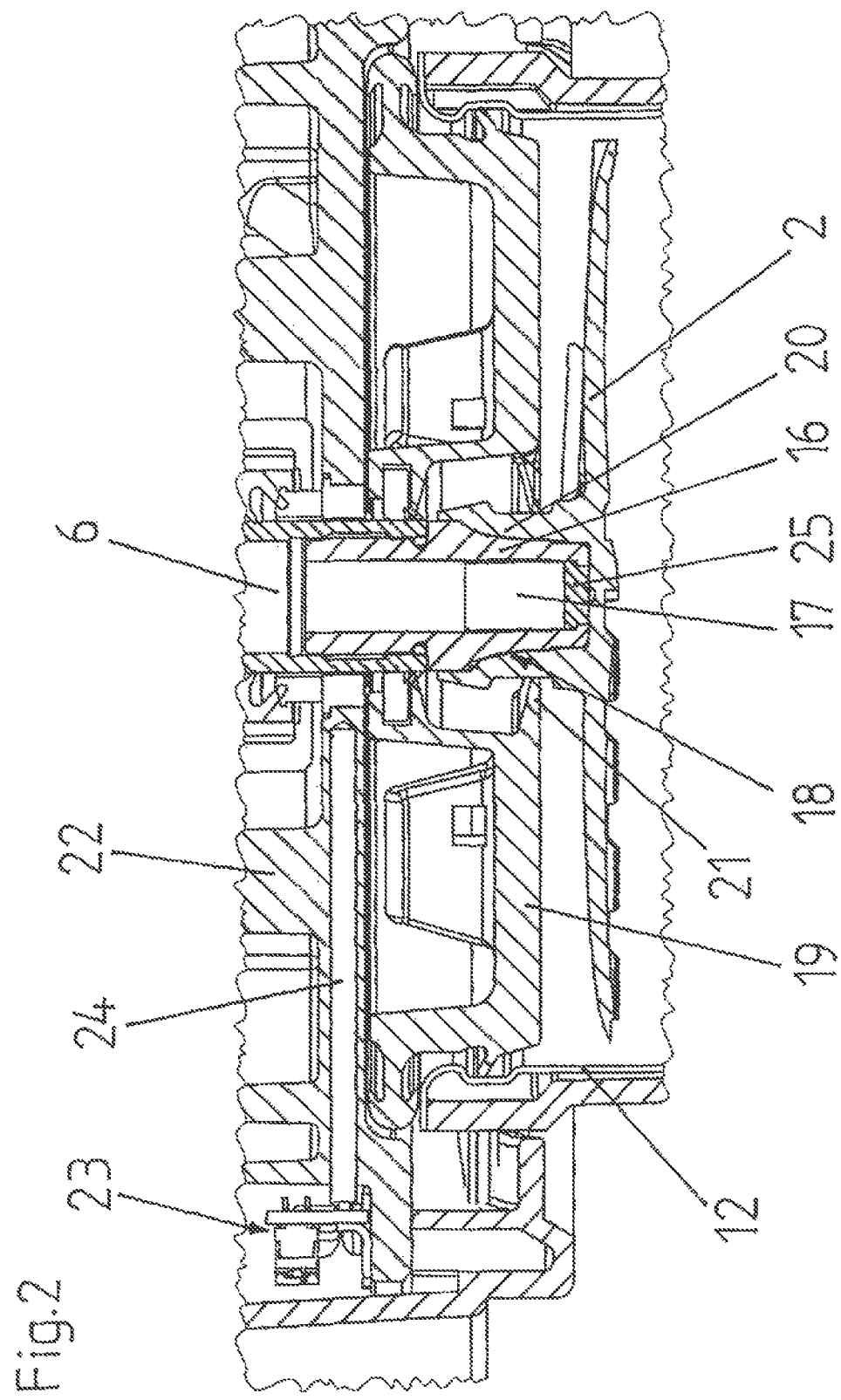
FIG. 2 a sectional view through the area of the device from FIG. 1, in which the lower end of the blade shaft is supported.

As can be seen from FIG. 2 which shows a sectional view of the area of the device in FIG. 1 in which the lower end of the blade shaft 6 is supported, the tool 2 which is made of ferromagnetic stainless steel and which is coupled to the end of the shaft 16 as intended, abuts axially against the end 16 of the shaft 6 and is thereby held at the end of the shaft in a force locking manner by a magnet 17 arranged centrally in the end of the shaft 16. The magnet 17 which is covered on its front side with a small stainless steel plate 25 is thereby located completely inside the tool 2. The drive forces are transmitted from the shaft 6 to the tool 2 by means of a helical gearing 18 between the tool 2 and the end of the shaft 16 which creates a rotatoric form-lock between them.

As can be seen, the container 12 comprises a cover 19 which is penetrated by the blade shaft 6 and which, before coupling the shaft 6 to the knife 2 by inserting the end 16 of the shaft 6 into the hub 20 of the tool 2, holds the tool 2 with retaining lugs 21 on the underside of the cover 19.

As can further be seen, the cover 19 seals the container 12 against a bottom housing 22 of the device, which is formed by an aluminum injection molding or a plastic injection molding.

In an area away from the shaft 6 or the end of the shaft 16, respectively, a Hall sensor 23 with associated-evaluation electronics is arranged, which detects magnetic fields. A ferrite rod 24 is arranged between the Hall sensor 23 and an area which, in the situation shown with the shaft fully retracted, is close to the end 16 of the shaft 6, which holds the tool 2 as intended, which ferrite rod conducts magnetic fields from this area to the Hall sensor 23. Depending on whether or not a tool 2 is coupled to the end of the shaft 16 as intended or not, the magnetic field emitted by the magnet 17 and transmitted to the Hall sensor 23 via the ferrite rod 24 has a different characteristic.

The magnet 17, the ferrite rod 24 and the Hall-sensor 23 are part of a tool detection device according to the claims of the device according to the invention, by means of which different characteristic magnetic field strengths can be distinguished in the shown axial position of the shaft 6, when the tool 2 is coupled to the end of the shaft 16 as intended and when the tool 2 is not coupled to the end of the shaft 16 or not coupled to the end of the shaft 16 as intended, respectively, for determining whether the tool 2 is arranged at the end of the shaft 16 as intended or not.

If the tool detection device detects in the shown axial position of the shaft 6 that no tool 2 is coupled to the end of the shaft 16 or that at least no coupled as intended tool 2 is present, it blocks the further operation of the device as.

While in the present application there are shown preferred embodiments of the invention, it should be clearly stated that the invention is not limited thereto and that it can be carried out in other ways within the scope of the following claims.

The invention claimed is:

1. A device for shredding frozen food products provided in block form with a tool (2) for shredding at least a part of the frozen food products block, wherein:
   the tool is coupled to one end (16) of a rotatable shaft (6), which during intended operation of the device rotates the tool about an axis of rotation (X) and advances the tool along the axis of rotation (X) in a direction (S) towards the frozen food products block, thereby scraping off layers of food from the frozen food products block;
   coupling of the tool (2) on the end of the shaft (16) is designed in such a way that the tool (2) can be removed from the end of the shaft (16) without other tools and can be recoupled to the end of the shaft (16) as intended;
   the tool (2) when coupled to the end of the shaft (16) as intended abuts axially against the end (16) of the rotatable shaft (6) and is thereby held in a force-locking manner on the end (16) of the rotatable shaft (6);

the tool (2) when coupled to the end of the shaft (16) as intended forms a rotational form-lock in said tool's intended direction of drive rotation with the end (16) of the rotatable shaft (6) for transmitting drive forces from the shaft (6) to the tool (2), the device comprises a tool detection device (17, 23, 24) by which it can be determined whether a tool (2) is arranged at the end of the shaft (16) as intended or not;

the coupling of the tool (2) at the end of the shaft (16) is designed in such a way that the tool (2) which is coupled to the end of the shaft (16) as intended is held at the end of the shaft (16) by magnetic force; and wherein the tool detection device (17, 23, 24) comprises a Hall sensor (23) with associated evaluation electronics, by which, at least in a certain axial position of the shaft (6), different characteristic magnetic field strengths can be distinguished between the tool (2) being coupled to the end of the shaft (16) as intended and the tool (2) not being coupled to the end of the shaft (16), respectively, for determining whether the tool (2) is arranged on the end of the shaft (16) as intended or not.

2. Device according to claim 1 wherein at least in one axial position of the shaft (6), in which the tool (2) coupled to the end of the shaft (16) as intended has a maximum distance from the to-be-shredded frozen food products block, different characteristic magnetic field strengths can be distinguished between the tool (2) being coupled to the end of the shaft (16) and the tool (2) not being coupled to the end of the shaft (16), for determining whether the tool (2) is arranged at the end of the shaft (16) as intended or not.

3. Device according to claim 2, wherein the Hall sensor (17) is arranged on a stationary component (22) of the device.

4. The device according to claim 2 wherein said device is for pureeing or pacotizing said frozen food product.

5. The device according to claim 2 wherein the axis of rotation (X) is oriented vertically.

6. Device according to claim 1, wherein the Hall sensor (17) is arranged on a stationary component (22) of the device.

7. Device according to claim 6, wherein the Hall sensor is arranged in a region close to the shaft.

8. The device according to claim 7, wherein the Hall sensor is arranged in a region which, with the shaft being fully retracted, is near the end of the shaft which holds the tool as intended.

9. Device according to claim 6, wherein the Hall sensor (17) is arranged in a region remote from the shaft (6), and wherein a ferrite rod (24) is arranged between the Hall sensor (17) and the shaft (6).

10. Device according to claim 9, wherein substantially no ferromagnetic components are arranged between the ferrite rod (24) and the end (16) of the shaft (6) holding the tool (2).

11. Device according to claim 9, wherein ferrite rod (24) is arranged between the Hall sensor (17) and a region which, when the shaft (6) is fully retracted, is close to the end (16) of the shaft (6) which holds the tool (2) as intended.

* * * * *